Feb. 9, 1971   C. A. DANFORTH   3,561,050
PELLET MACHINE
Filed May 3, 1968   2 Sheets-Sheet 1
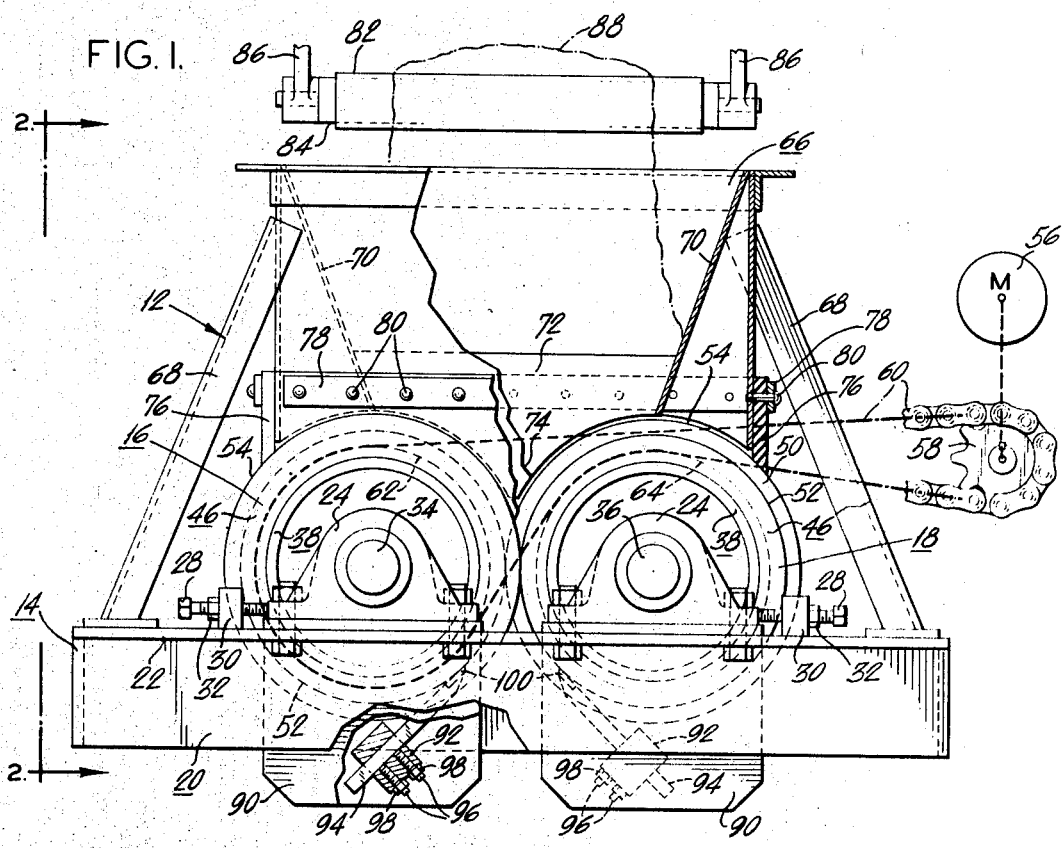
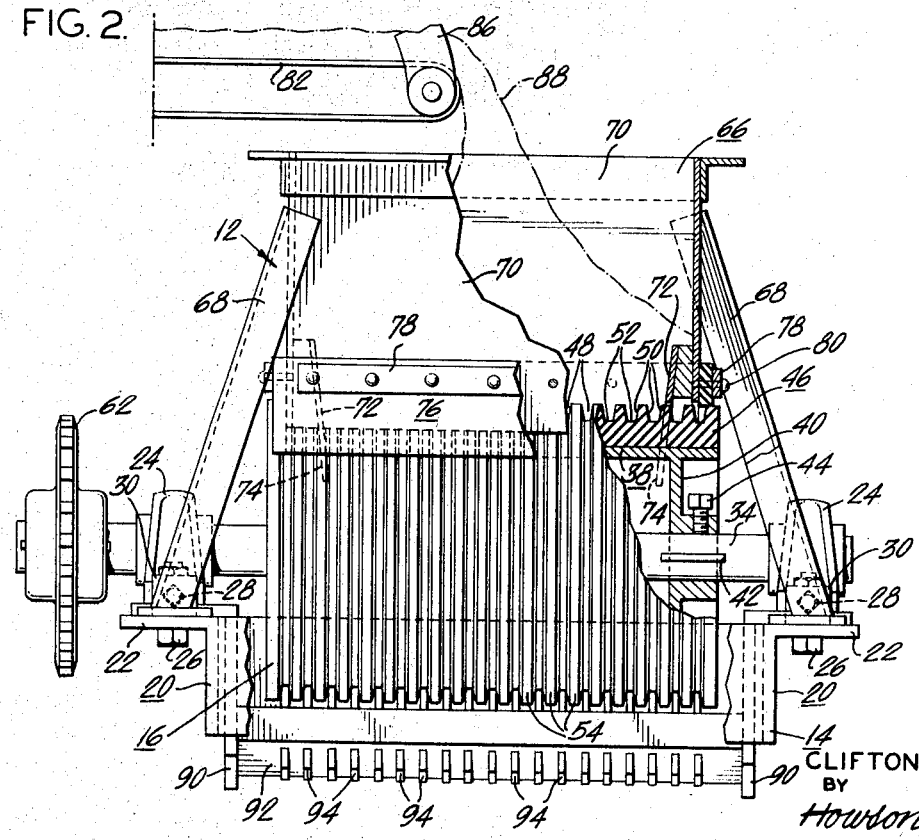
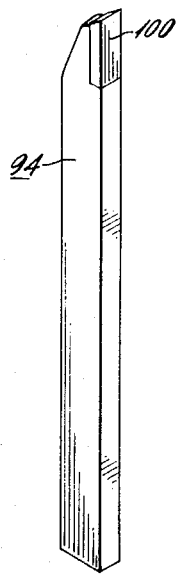
INVENTOR:
CLIFTON A. DANFORTH
BY
Howson & Howson
ATTYS.

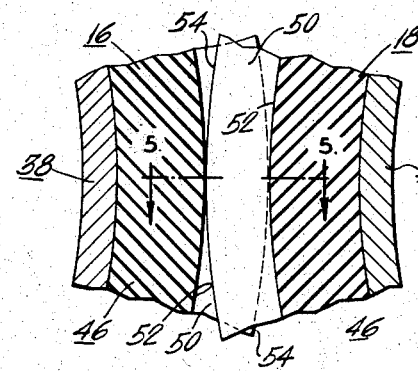
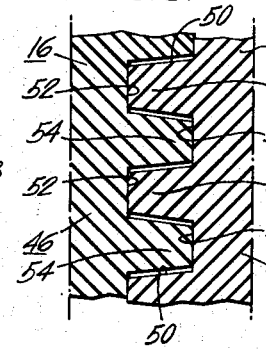
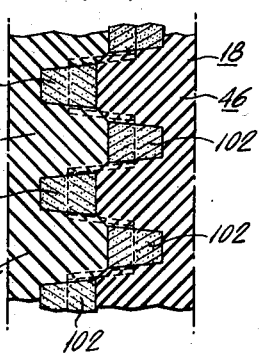
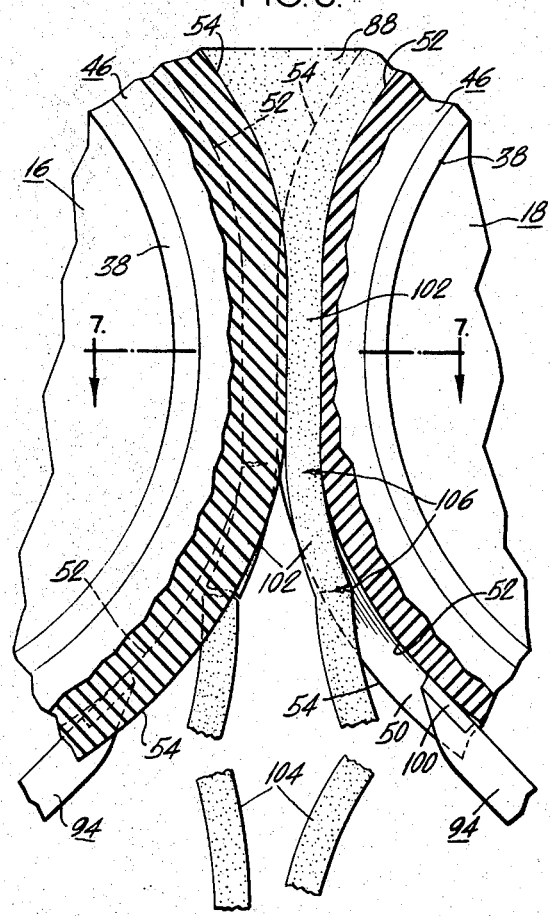
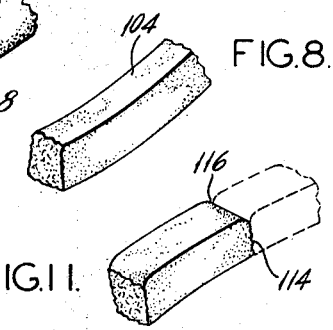
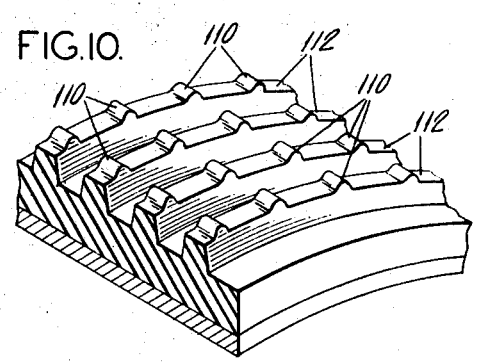
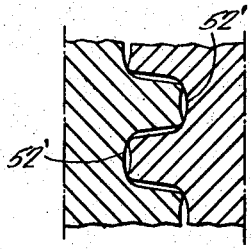
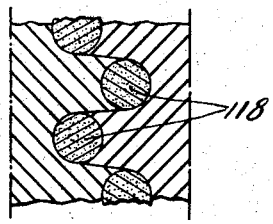

United States Patent Office 3,561,050
Patented Feb. 9, 1971

3,561,050
PELLET MACHINE
Clifton A. Danforth, Oreland, Pa., assignor to G. & W. H. Corson, Inc., Plymouth Meeting, Pa., a corporation of Delaware
Filed May 3, 1968, Ser. No. 726,514
Int. Cl. B29d 7/14; B28b 3/12
U.S. Cl. 18—9
10 Claims

ABSTRACT OF THE DISCLOSURE

A pellet machine characterized by a pair of opposed pelletizing rolls mounted on horizontal parallel axes, each of the rolls having cylindrical resilient surfaces characterized by spaced continuous circumferential grooves forming annular lands therebetween. The rolls are disposed with the lands of each roll extending into the grooves of the adjacent roll and means are provided for rotating the rolls to provide a downward movement of the cooperatively engaged portions thereof. Suitable means are disposed above the rolls for introducing material to be pelletized into the nip of the rolls. The material passage between the interacting rolls provides a compaction and pelletizing of the material due to the elastic deformation of the resilient roll surfaces.

---

The present invention relates generally to pelletizing apparatus and relates more particularly to an apparatus for pelletizing materials in finely divided particle form such as fly ash, lime, limestone, iron ore, foods, pigments and the like.

Various types of apparatus have been employed in the past for pelletizing materials. Basically these have been the extruder, pan and drum types. In the extruder type, the material is extruded through a die, the extruded material being cut off by suitable means to the desired pellet length. Depending on the equipment employed, the material is advanced through the die either by means of an extruding screw or by relative rotation of a roll and a ring die. The pan and drum types employ a rotating pan or drum which forms pellets from the loose material.

In the die type pellet machines, a major problem is the friction occurring during passage of the material under pressure through the pelletizing die. This friction particularly with abrasive materials results in a very rapid wear of the die and feed screw and in addition requires a substantial power input. As a result, maintenance expenses are extremely high and periodic shutdown is required for replacement of the worn parts. In addition, the pellets produced in die type machines tend to be layered rather than homogeneous due to the pulsating nature of the material feed into the die cavities.

In the pan and drum type machines, due to the nature of the operation, the uniformity of moisture content and pellet size are difficult to control and the product tends to be stratified rather than homogeneous.

In the present invention, apparatus of a relatively simple design is provided which permits a pelletizing of materials in an economical controlled manner. In brief, the present invention includes a pair of cooperating pelletizing rolls mounted on horizontal parallel axes, the cylindrical surfaces of each of the rolls being of a resilient material and having uniformly spaced continuous grooves cut circumferentially therein. The rolls are disposed with the lands of each roll extending into the grooves of the opposed roll and means are provided for rotating the rolls to provide a downward movement of the intermeshing land portions. Hopper means are provided above the rolls to direct a gravity flow of material uniformly into the nip of the rolls whereupon material passing between the intermeshing rolls deforms the adjacent roll portions and is uniformly compacted into ribbons by the compressive force of the deformed resilient portions. Upon discharge from the rolls the ribbons are broken into discrete pellets by the elastic return of the deformed resilient roll portions. The size and shape of the pellets may be accurately controlled by appropriate selection of the size of the rolls and the size and configuration of the lands and grooves, the spacing of the rolls, the resilience and thickness of the resilient roll surfaces, and the speed at which the rolls are rotated. Due to the resilient nature of the roll surfaces contacting the material and due to the absence of appreciable material flow with respect to the roll surfaces, frictional wear is virtually eliminated and the power consumption in contrast with previous pelletizing machines is accordingly sharply reduced. The uniform application of pressure to the material further insures a homogeneous character of the pellets.

In view of the above it can be understood to be a first object of the present invention to provide a pelletizing apparatus of a novel construction which requires an extremely low power input in contrast with conventional pelletizing machines.

Another object of the invention is to provide an apparatus as described which may be economically constructed and which requires little maintenance due to the absence of significant frictional wear of the pelletizing elements.

An additional object of the invention is to provide an apparatus as described which effectively operates to provide a controlled pelletizing operation.

A further object of the invention is to provide a pelletizing apparatus as described adapted to produce pellets having a homogeneous grain structure.

Still another object of the invention is to provide a pelletizing apparatus as described which discharges the pellets over a transverse area thus permitting a uniformly distributed loading of the pellets on a processing conveyor without handling to minimize production of fines.

Additional objects and advantages of the invention will be more readily apparent from the following detailed description of embodiments thereof when taken together with the accompanying drawings in which:

FIG. 1 is a side elevational view of a pelletizing apparatus in accordance with the present invention with portions broken away to show details of construction thereof;

FIG. 2 is an end elevational view taken along line 2—2 of FIG. 1, partly broken away and in section to show interior details of the apparatus;

FIG. 3 is an enlarged perspective view showing one of the cleaning fingers utilized in the apparatus of FIGS. 1 and 2 to clear the pelletizing roll grooves;

FIG. 4 is an enlarged fragmentary elevational view showing the intermeshing of the pelletizing roll lands;

FIG. 5 is a sectional view taken along line 5—5 of FIG. 4;

FIG. 6 is an enlarged fragmentary elevational view of the pelletizing rolls partly broken away and in section showing the deformation of the rolls during the pelletizing operation and the manner in which the pellets are discretely formed by the elasticity of the resilient roll portions;

FIG. 7 is a sectional view taken along line 7—7 of FIG. 6;

FIG. 8 is a perspective view showing a pellet formed by the apparatus of FIGS. 1–7;

FIG. 9 is a view similar to FIG. 4 showing a modified form of the pelletizing apparatus wherein the roll lands include spaced teeth;

FIG. 10 is a fragmentary, sectional perspective view showing the toothed lands of the modified embodiment of FIG. 9;

FIG. 11 is a perspective view showing the type of pellet produced by the toothed roll lands of the embodiment of FIGS. 9 and 10;

FIG. 12 is a fragmentary sectional view showing the intermeshing lands of another embodiment of the invention in their non-operating condition;

FIG. 13 is a view as in FIG. 12 showing the deformation of the rolls during a pelletizing operation; and FIG. 14 is a perspective view showing the type of pellet produced by the modified rolls shown in FIGS. 12 and 13.

Referring to the drawings and with particular reference to FIGS. 1 and 2, a pelletizing machine generally designated 12 i illustrated and includes a substantially rectangular frame 14 upon which a pair of pelletizing rolls 16 and 18 are mounted for rotation in horizontal parallel relationship. As shown most clearly in FIG. 2, the sides of the frame 14 comprise angles 20 having outwardly directed flange portions 22 to which are secured pillow blocks 24 for journaling the pelletizing roll shafts. The pillow blocks are secured to the flanges 22 by bolts 26 passing through longitudinal slots in the flanges. Longitudinal adjustment of the pillow block positions on the flanges 22 may be made by means of the adjusting screws 28 threadedly engaged in bosses 30 attached to the upper surface of the flanges 22. Lock nuts 32 on the adjusting screws 28 serve to lock the adjusting screws in the position desired.

The pelletizing rolls 16 and 18 are respectively mounted on shafts 34 and 36 journaled in the pillow blocks and as shown in FIG. 2 each comprises a metal cylindrical inner roll element 38 having end hub portions 40 secured to the shaft by keys 42 and screws 44. The outer surface of each metal roll element 38 is covered with a resilient sleeve 46 of substantial thickness which may for example be of synthetic rubber or other suitable resilient material. The outer cylindrical surface of each sleeve 46 includes a plurality of spaced continuous circumferential grooves 48, each groove having in the preferred embodiment inwardly converging side walls 50 terminating in a cylindrical groove floor 52. The lands 54 between the grooves are, due to the close groove spacing, slightly smaller than the grooves to allow intermeshing of the rolls.

As shown in FIG. 5, the rolls 16 and 18 are positioned axially on the shafts 34 and 36 in such a manner that the lands of one roll are aligned with the grooves of the opposed roll, and the rolls are cooperatively positioned by means of the adjusting screws 28 so as to intermesh the lands of the opposed rolls. As indicated in FIGS. 1, 4 and 5, in the embodiment illustrated the lands of each roll are seated against the groove floors of the opposed roll although some radial spacing may be permissible depending upon the material to be pelletized. As shown in FIG. 5, there is a slight axial spacing between the intermeshing lands in the non-operating condition of the apparatus.

The rolls 16 and 18 are each driven in the opposite direction by a motor 56 driving a chain sprocket 58 around which passes a drive chain 60. The drive chain passes around a sprocket 62 keyed to the end of shaft 34 and over the top of a sprocket 64 on shaft 36 whereby uniform opposed rotation of the shafts is effected. The shafts are rotated so that the intermeshing lands of the rolls are moved downwardly at the same rate.

Feed means are provided for directing material to be pelletized uniformly into the nip of the intermeshing rolls. The feed means in the illustrated embodiment comprises a hopper 66 supported above the rolls by the legs 68 at each corner thereof which are anchored to the corners of the frame 14. The hopper includes inclined end panels 70 for directing the material generally toward the interacting roll faces, the lower ends of the plate 70 extending closely adjacent the lands 54 of the rolls. Similarly, side panels 72 within the hopper are angled inwardly and are provided with a tooth shaped lower portion 74 extending downwardly between the opposed rolls to guide the material into the nip of the rolls and prevent the axial escape of material. To minimize dust and further enclose the pelletizing rolls, resilient skirt elements 76 are secured to the exterior of the hopper around the lower edges thereof by means of securing plate 78 and fastenings 80. The skirt members along the sides of the rolls are appropriately shaped to closely fit the contours of the rolls and prevent materia escape from the hopper and rolls.

Material is introduced into the hopper in the illustrated embodiment by an overhead conveyor 82, a roll 84 of which is journaled above the hopper by means of support brackets 86. Material 88 to be pelletized is fed along the conveyor 82 and drops therefrom into the hopper 66 from which it descends by gravity uniformly into the nip of the pelletizing rolls 16 and 18. The hopper size and the depth of the material accumulated therein will depend on the nature of the material, the rate of the pelletizing operation, and the effect of the hopper loading on the pelletized product.

Depending from the frame 14 below the ends of each of the rolls 16 and 18 are brackets 90 between each pair of which extends a transverse angled support member 92 which is slotted to receive a plurality of groove cleaning fingers 94, the tips of which extend in tangential relation into the grooves of the pelletizing rolls. The cleaning fingers are secured in the slotted support member 92 by set screws 96 having lock nuts 98 thereon as shown in FIG. 1. The fingers are preferably equipped with sharpened tip inserts 100 of a hardened material such as tungston steel to prevent rapid wear particularly when abrasive materials are run through the machine.

For operation of the present invention, the motor 56 is started and is adapted through suitable gear reduction means or speed control (not shown) to drive the pelletizing rolls 16 and 18 at a relatively slow speed for example 25 r.p.m. The material to be pelletized is fed into the hopper 66 along the conveyor 82 at a suitable rate and may comprise any type of material in finely divided particle form such as fly ash, iron ore, etc. The invention is particularly well suited for the pelletizing of light weight aggregate such as the type described in U.S. Pat. 3,341,341, assigned with the present application to a common assignee.

As shown in FIGS. 6 and 7, the rotation of the intermeshed rolls advances material between the lands of each roll and the groove floors of the opposed roll by deforming the resilient roll portions in the manner illustrated. The passage of the material between the rolls in this manner results in the formation of a plurality of ribbons 102 which as shown in FIG. 7 have a keystone-shaped cross section. The ribbons of compacted material as most clearly seen in FIG. 6 due to the compression of the resilient roll surfaces are formed in an essentially linear flattened region of the rolls. Upon emerging from the engaged portions of the rolls, the ribbons are broken into discrete pellets 104 by the elastic return of the deformed roll portions which eject the ribbons from the grooves causing breakage of the ribbons at spaced intervals 106. The fingers 94 serve to clean any residual particles from the grooves and to prevent the possibility of a wedged pellet from continuing around the periphery of the roll.

With the rolls being driven at the same rotational speed, the peripheral speed of the intermeshing lands is the same, and there is thus substantially no movement of the roll surfaces with respect to the material being pelletized. The large frictional power losses and the destructive wear characterizing previously employed pelletizing devices are thus substantially eliminated. Furthermore, the resilient rolls gradually and uniformly apply a compressive force in forming the ribbons thereby producing a homogeneous pellet rather than the layered type pellet produced with the pulsating feed extrusion devices. A relatively uniform granular structure of the pellets is thus assured which is important for example in the formation of light weight aggregate for use in structural concrete.

A slightly modified form of the invention is shown in FIGS. 9 and 10 wherein the apparatus is identical with that described in the preferred embodiment with the exception of the addition of spaced axially oriented teeth 110 on the roll lands 112. In this embodiment, the teeth of the intermeshing roll lands as shown in FIG. 9 are preferably in peripheral contact with the opposed groove floors. The teeth 110 notch the ribbons of compacted material passing between the rolls to control the breakoff points and hence the length of the pellets. As shown in FIG. 11, wherein a pellet formed by the modified embodiment is illustrated with the adjacently formed pellet shown in broken lines, the pellet may be seen to have broken along a line 114 extending from the notch 116 formed by one of the land teeth 110. The teeth may be either an integral part of the resilient roll lands as illustrated, or may comprise inserts of metal or other suitable material. The size and shape of the teeth may vary considerably while the circumferential distance between the teeth is dependent on the pellet length desired.

The configuration of the grooves and lands may be varied to produce the pellet shape desired. In the modification of FIGS. 12 and 13, the groove floors 52' are of an arcuate shape, while the opposed peripheral surfaces of the lands are of a concave shape. As a result, as shown in FIGS. 13 and 14, the pellets 118 are formed with a substantially cylindrical cross-section, eliminating the sharp edges of the previously described pellets and minimizing the production of fines during subsequent handling. Other pellet shapes may similarly be produced by variation of the groove and land configurations.

The compression ratio attained with the present invention is dependent on a number of factors including the thickness of the resilient roll sleeves, the resilience of the sleeves, the spacing of the rolls, and the speed at which the apparatus is run. In tests employed in pelletizing the light weight aggregate described in the above mentioned Pat. 3,341,341, the power input requirement as contrasted with that required by an auger and die type pelletizing machine of the same output showed a tenfold reduction, the auger-die type machine requiring 50 HP whereas with the present device only 4 HP was required to produce the same output. At the same time, the wear factor was correspondingly reduced, the wear of the present resilient roll surfaces being negligible compared to that of the auger and die unit.

The discharge of the pellets from the device across a transversely extending area beneath the pelletizing rolls is advantageous for the loading of a processing conveyor without requiring the need of distributing chutes or other means which tend to produce fines. The present invention is being successfully used for example to replace the pelletizer in the sintering apparatus shown in U.S. Pat. 3,329,419, assigned with the present application to a common assignee and in such application could be utilized to directly load the moving pallets with a minimum disturbance of the newly formed pellets.

Although the illustrated apparatus employs a single pair of pelletizing rolls, it will be obvious that two or more pairs of rolls may be disposed in closely adjoining parallel relation to increase the capacity of the apparatus.

Manifestly, changes in details of construction can be effected by those skilled in the art without departing from the spirit and the scope of the invention as defined in and limited solely by the appended claims.

I claim:

1. Pelletizing apparatus comprising a pair of pelletizing rolls mounted for rotation about parallel axes, said rolls each including a peripheral resilient portion having a plurality of spaced continuous circumferential grooves in the outer face thereof defining circumferential lands therebetween, said rolls being juxtaposed with the lands of each roll intermeshing with the grooves of the opposed roll, and drive means for rotating said rolls, said resilient roll portions being adapted to permit material passing between said lands and said grooves during rotation of said rolls to resiliently deform said resilient portions of said rolls to effect a uniform compression of the material into elongated ribbons, the ribbons being discharged from said rolls by the elastic return of the deformed roll portions.

2. Apparatus as claimed in claim 1 wherein each of said lands includes a plurality of circumferentially spaced teeth projecting radially therefrom.

3. Pelletizing apparatus comprising a pair of pelletizing rolls mounted for rotation about horizontal parallel axes, said rolls each including a peripheral resilient portion having a plurality of spaced continuous circumferential grooves in the outer face thereof defining circumferential lands therebetween, said rolls being juxtaposed with the lands of each roll intermeshing with the grooves of the opposed roll, means disposed above said rolls for introducing material to be pelletized into the nip of said intermeshing rolls, and drive means for rotating said rolls to provide a uniform downward movement of the intermeshing grooves and lands thereof, said resilient roll portions being adapted to permit material passing between said lands and said grooves during rotation of said rolls to resiliently deform said resilient portions of said rolls to effect a uniform compression of the material into elongated ribbons, the ribbons on discharge from said rolls being broken into discrete pellets by the elastic return of said deformed roll portions.

4. Apparatus as claimed in claim 3 wherein each of said lands includes a plurality of circumferentially spaced teeth projecting radially therefrom.

5. Apparatus as claimed in claim 3 including groove cleaning fingers mounted beneath each roll and extending into the grooves thereof.

6. Apparatus as claimed in claim 3 wherein said lands are narrower than said grooves.

7. Pelletizing apparatus comprising a frame, a pair of cooperating pelletizing rolls mounted on said frame for rotation about horizontal parallel axes, each of said rolls being secured to a shaft journaled in bearings mounted on said frame, each of said rolls comprising a peripheral resilient portion having a plurality of spaced continuous circumferential grooves in the outer face thereof defining circumferential lands therebetween, said grooves having a width greater than the width of said lands, said rolls being juxtaposed with the lands of each roll extending into the grooves of the opposing roll, a hopper on said frame adapted to guide material to be pelletized into the nip of said rolls, a plurality of groove cleaning fingers mounted on said frame beneath said roll extending tangentially into said grooves to prevent the passage of material around the circumference of said rolls, and drive means for rotating said rolls at a uniform rate in the opposite direction to provide a downward movement of the intercooperating roll lands, said resilient roll portions being adapted to permit material passing between said lands and said grooves during rotation of said rolls to resiliently deform said resilient portions of said rolls to effect a uniform compression of said material into elongated ribbons, said ribbons on discharge from said rolls being broken into discrete pellets by the elastic return of said deformed roll portions.

8. Apparatus as claimed in claim 7 wherein each of said lands includes a plurality of circumferentially spaced teeth projecting radially therefrom adapted to notch the compressed ribbons of material and thus control the length of pellets formed therefrom.

9. Apparatus as claimed in claim 7 wherein each of said rolls comprises a metal cylindrical inner roll element having a sleeve of resilient material secured therearound.

10. Apparatus as claimed in claim 7, including means on said frame for adjusting the spacing of the axes of said rolls.

(References on following page)

References Cited

UNITED STATES PATENTS

| | | | |
|---|---|---|---|
| 271,911 | 2/1883 | Pearson | 18—9UX |
| 781,781 | 2/1905 | Milne | 25—76 |
| 1,977,099 | 10/1934 | Thompson | 25—76 |
| 2,170,520 | 8/1939 | Raynolds 18—Rubber Mold Digest | |
| 2,917,821 | 12/1959 | Fritcsh | 18—9X |
| 3,140,511 | 7/1964 | Senfert et al. | 18—9X |
| 3,255,285 | 6/1966 | Chilson | 18—21X |
| 3,339,233 | 9/1967 | Woitzel et al. | 18—9 |
| 3,419,937 | 1/1969 | Bally | 18—21UX |

FOREIGN PATENTS

| | | | |
|---|---|---|---|
| 224,393 | 2/1943 | Switzerland | 25—76 |

WILLIAM S. LAWSON, Primary Examiner

U.S. Cl. X.R.

18—21; 25—77